Figure 1:
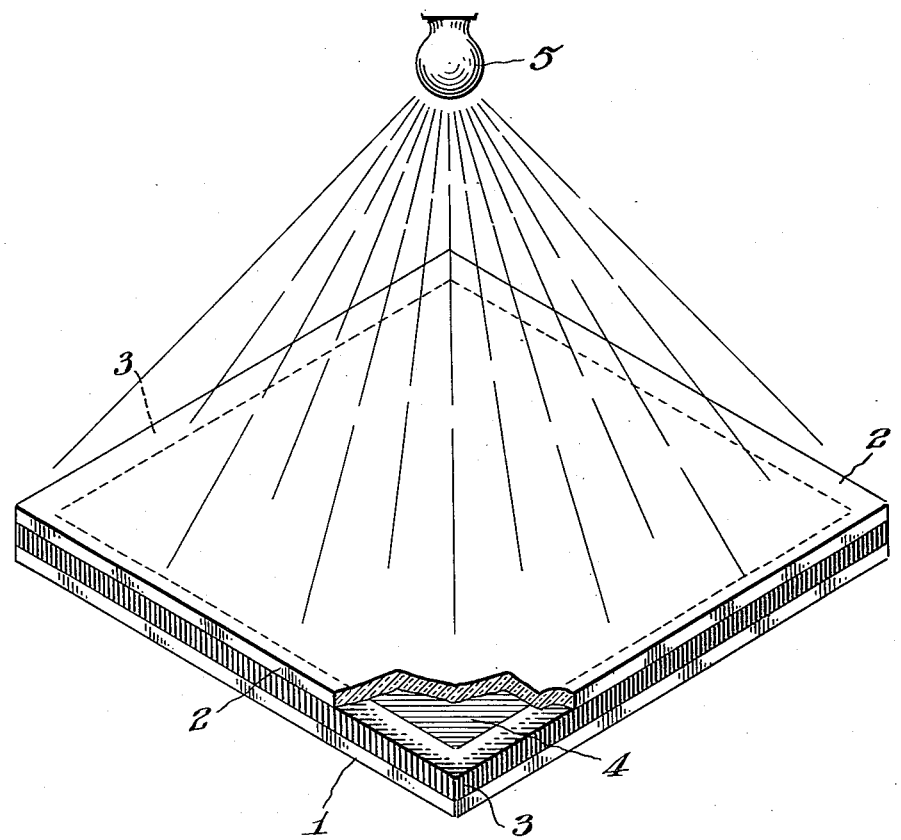

Aug. 30, 1949.　　　　B. M. MARKS　　　　2,480,751
PREPARATION OF CAST SYNTHETIC RESIN
HAVING INTEGRAL SHEEN

Filed Jan. 22, 1948　　　　　　　　　　　　2 Sheets-Sheet 1

INVENTOR.
BARNARD M. MARKS
BY
ATTORNEY

INVENTOR
BARNARD M. MARKS
BY
ATTORNEY

Patented Aug. 30, 1949

2,480,751

UNITED STATES PATENT OFFICE 2,480,751

PREPARATION OF CAST SYNTHETIC RESIN HAVING INTEGRAL SHEEN

Barnard M. Marks, Newark, N. J., assignor to E. I. du Pont de Nemours & Company, Wilmington, Del., a corporation of Delaware Application January 22, 1948, Serial No. 3,714

8 Claims. (Cl. 204—158)

This invention relates to cast synthetic resin and, more particularly, to the preparation of such resin in the form of sheets and bodies of other shapes having integral sheen.

The term "integral sheen" is used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation within the material of lamellae (flat plates, crystals and the like) or substances capable of reflecting light. As regards appearance, the term thus includes the various types of sheen and character of sheen commonly designated, in the plastics industry, by the terms pearly, nacreous, silky, metallic, chatoyant and pearlescent.

Various substances characterized in common by their occurrence in the form of light-reflecting lamellae, have been widely used for the purpose of imparting integral sheen to various transparent or substantially transparent plastics, such as cellulose esters and resin plastics. Such substances, including the so-called pearl essence obtained from fish scales, various inorganic and organic substitutes therefor, and metal bronzing powders, are well known in the art, as are also various methods whereby these lamellae may be brought into systematic orientation so as to yield certain desired visual effects. It is well recognized that to obtain a sheen effect light-reflecting lamellae must be positioned or oriented so that a large percentage of them lie with their broad faces parallel to each other and substantially parallel to the surface of the plastic which is to have the appearance of sheen.

For years cellulose nitrate stock having integral sheen has been used in the manufacture of fountain pens, pencils and the like. Such stock is obtained by various casting, extruding, and layup techniques disclosed in numerous patents. More recently, synthetic resins having integral sheen have been obtained by the incorporation of light-reflecting lamellae in polymerizable liquid organic compounds and subjecting same to polymerizing conditions in a manner that causes orientation of the light-reflecting lamellae. For example, rods and tubes of cast synthetic resin having integral sheen may be prepared by progressive polymerization along the longitudinal axis of a rod mold (Fields et al. U. S. Patent 2,168,331) or by centrifugal casting in a cylindrical mold (Clewell et al. U. S. Patent 2,265,226) of such light-reflecting lamellae-containing polymerizable compounds.

An object of the present invention is to provide a new and improved process of producing cast synthetic resin having integral sheen. A more particular object is to provide cast synthetic resin sheets having integral sheen and a process of producing such sheets. A further object is to provide a process of producing mottled patterns in cast synthetic resin, such patterns resulting from the orientation of light-reflecting lamellae. Other objects will be apparent from the description of the invention given hereinafter.

The above objects are accomplished according to the present invention by suspending light-reflecting lamellae in a polymerizable liquid organic compound adapted to give a polymer solid at normal temperatures, subjecting a body of the resulting mixture to a source of actinic energy to induce polymerization thereof and continuing to subject the body to that source of actinic energy until a pattern appears in the body, and thereafter subjecting the body to polymerization conditions until polymerization thereof is substantially complete.

In a preferred and more specific form, the invention is carried out by adding a photopolymerization catalyst to a mixture of light-reflecting lamellae and a polymerizable liquid organic compound, introducing the mixture into a mold such as cells for casting sheets disclosed in Rohm et al. U. S. Patent 2,154,639, these cells usually being composed of two glass plates separated by a compressible gasket, and subjecting one or both sides of the cell to an appropriate source of light until the desired pattern appears in the polymerizing body, after which polymerization is completed by thermal means.

The present invention resides to an important degree in the discovery of a most remarkable phenomenon, namely, that if a body of a polymerizable liquid organic compound having light-reflecting lamellae suspended therein is exposed to actinic energy, a mottled type of pattern will develop in the polymerizing mass. The word "mottled," as used herein, applies to a pattern having a variegated appearance and exhibiting sheen. Further, it has been found that the degree of contrast or sharpness in the mottled pattern produced in the polymerizing body can be varied depending upon the duration of exposure to actinic energy. Short exposure cycles produce patterns of lesser gradations of contrast than long cycles. Thus, by following the method of this invention, a mottled pattern having the desired gradation of contrast is produced by exposing the polymerizing body having light-reflecting lamellae suspended therein to a source of actinic energy until the desired pattern appears, and thereafter completing the polymerization by thermal means. Further, if a mottled pattern having a maximum gradation of contrast is desired, the polymerizing body is exposed to actinic energy until no further change is evident in the pattern, after which the polymerization may be completed by either thermal or actinic energy.

The following variables appear to have an effect upon the general configuration or type of mottled pattern produced in a polymerizing body having light-reflecting lamellae suspended therein: viscosity of the liquid polymerizable organic compound, catalyst concentration, concentration of light-reflecting lamellae, concentration of dye or pigment, time of exposure to actinic energy, position of mold during polymerization, intensity of actinic energy, and method of pouring the polymerizable compound into the mold. For any one set of conditions the general configuration or type of mottled pattern produced cannot be predetermined, but if any set of conditions is duplicated, the pattern can be substantially reproduced.

The most important of the above mentioned variables appear to be the viscosity of the polymerizable liquid, time of exposure to actinic energy, intensity of the actinic energy, and the position of the mold during irradiation. In order to maintain a uniform dispersion of the light-reflecting lamellae, the polymerizable liquid organic compound should have a viscosity within the range of 5 to 50 poises, and preferably, about 15 poises. In syrups having viscosities lower than 5 poises, there is a tendency for the larger particles of light-reflecting lamellae to settle out, and consequently a predominant pattern will be produced on only the lower side of the sheet or body being cast. However, syrup of such viscosities can be used when such an effect is desired. Polymerizable liquids having viscosities greater than approximately 50 poises appear to be too viscous to allow the formation of a reproducible mottled pattern in the polymerizing body upon exposure to actinic energy. By the same token, a mottled pattern will appear more rapidly in the polymerizing body when polymerizable liquids of low viscosities are used. Actinic energy of high intensity will also accelerate the formation of a pattern in the polymerizing body. The effect of long and short irradiation cycles upon the appearance of the pattern has been discussed hereinbefore.

The appearance of a pattern exhibiting sheen in the body of the polymerizing liquid is due to arrangement of the light-reflecting lamellae. The sheen results, as is well known, from orientation of the lamellae so that their broad faces lie parallel or substantially parallel to the surface of the body while the pattern also is a consequence of the arrangement of the lamellae. This orientating or arrangement of the lamellae is in no sense due to any motion imparted to the polymerizing body by external forces and it is necessary in order not to interfere with the development of the pattern or not to disturb it after it has developed that the polymerizing body be maintained in a quiescent state throughout the polymerization until the light-reflecting lamellae are immobilized. This means that care must be taken not to jar or suddenly move the container for the polymerizing mass or to turn it at a speed which would create any appreciable centrifugal force but it does not preclude slowly turning the container on a turn table for the purpose of insuring uniform exposure to light or carefully moving the container from one place to another.

Figure 2:
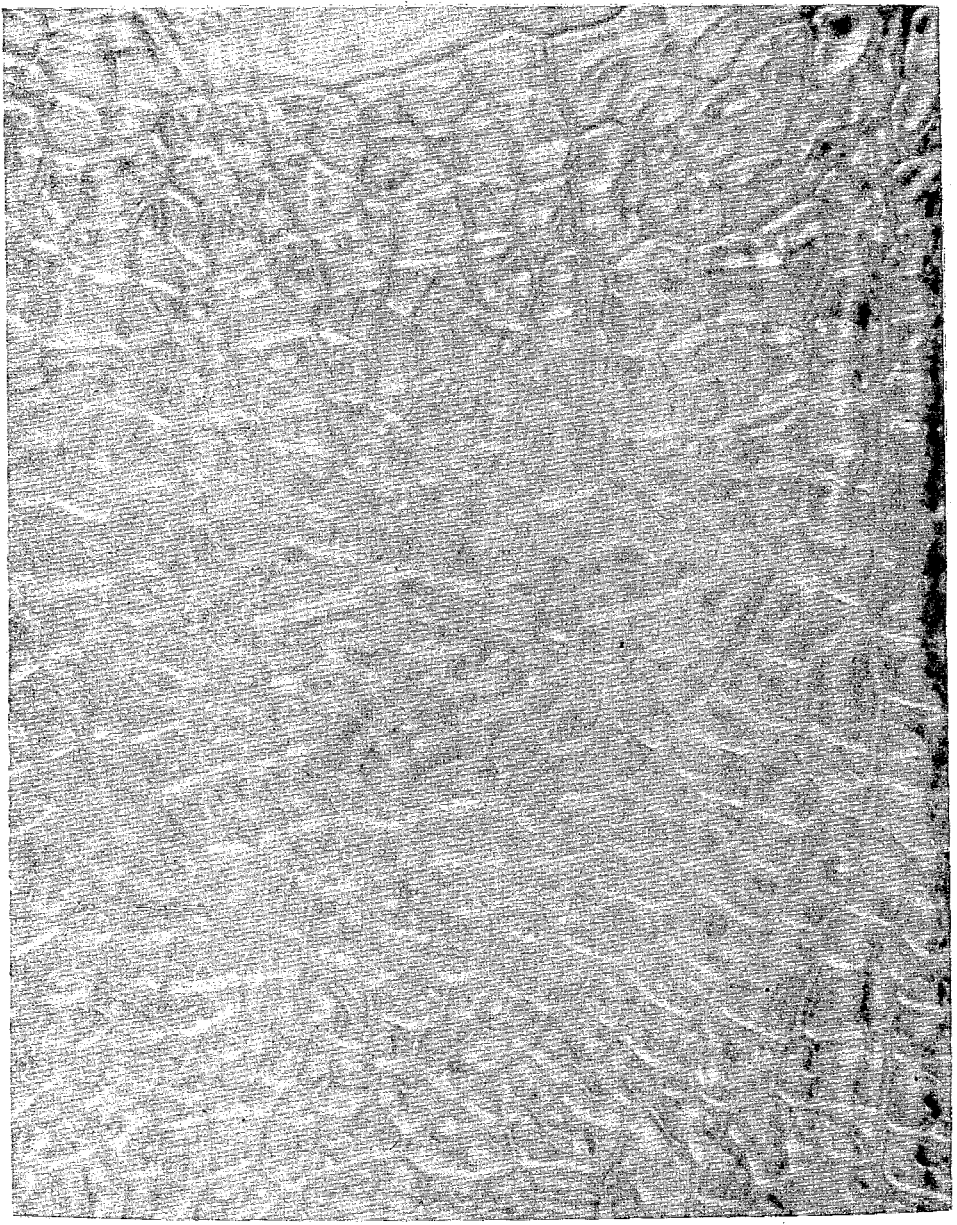

The manner of carrying out this invention will be more particularly described with reference to the accompanying drawing wherein:

Figure 1 is a perspective view, more or less diagrammatic, of an apparatus for carrying out the present invention, parts being broken away for purposes of illustration; and Figure 2 is a photographic elevation of the face of a square section of a typical cast sheet made by the apparatus shown in Figure 1.

Referring to Figure 1, there is shown in horizontal position a conventional cell assembly for the casting of sheets. The cell is composed of glass plates 1 and 2 separated by the compressible gasket 3. Disposed in the cell is the polymerizable liquid organic compound 4 containing suspended light-reflecting lamellae and a photopolymerization catalyst. It will be appreciated by those skilled in the art that the lamellae are not oriented at this stage, and because the broad faces of a lamellae are disposed at random, there is no sheen effect at all. It is only by the orientation of the lamellae so that a great majority in any particular area face parallel to the surface of the casting that a sheen effect is attainable.

A light source is designated by the reference 5, such source being an emitter of ultraviolet, visible, or infrared light, or a combination of these. The cell is positioned beneath the light source 5, and polymerization of the contents of the cell is effected by energizing the light source until a desired pattern appears. A short exposure to the light will produce a mottled pattern of lesser gradation of contrast than will a longer exposure. The time at which the desired pattern is set can be noted by observation. If all the variables mentioned hereinbefore are held constant, the pattern produced can be substantially reproduced by using the same exposure time. After the period of exposure to light, the polymerization is preferably completed by thermal means. Complete polymerization, however, may be carried out by long exposure to actinic energy if a mottled pattern of maximum gradation of contrast is desired. When it is desirable to obtain a smooth surface on the sheeting, it is recommended that the polymerization be completed before the sheet is stripped from the cell.

As shown in Fig. 2, the typical cast sheet made according to this invention exhibits integral sheen according to a mottled pattern, a cast resin sheet characterized by integral sheen in this mottled pattern being unknown heretofore.

The invention is applicable to the production of cast resin bodies of all shapes. Obviously, the mold which holds the polymerizable syrup, must be capable of transmitting actinic energy to the contents thereof but it may be of any shape. The application of the invention to the production of cast sheets is particularly important due to the demand for such sheets. In the production of cast sheets in a conventional cell such as illustrated in Fig. 1, either one or both sides of the cell may be exposed to a source of actinic energy. If both sides of the cell are exposed, the sources of actinic energy preferably should be similar and should be positioned at corresponding distances with respect to the surfaces of the cell in order to obtain substantially similar mottled patterns on both sides of the casting.

The following examples wherein all proportions are given by weight unless otherwise specified, illustrate specific embodiments of the present invention.

Example I

Monomeric methyl methacrylate containing 0.0015% of alpha,alpha'azobis(alpha,gamma,dimethylvaleronitrile) as a thermal polymerization catalyst, was heated at 55° C. until it thickened to a syrup having at room temperature a viscosity of about 10 poises. Using this syrup the following formulation was prepared:

| | Parts |
|---|---|
| Methyl methacrylate syrup | 700 |
| Paispearl paste (a paste of pearl essence from fish scales dispersed in cellulose nitrate solution) | 8 |
| Blue pigment | 0.0008 |
| Benzoin (photopolymerization catalyst) | 0.8 |

After thorough mixing, the above formulation was poured into a conventional sheet casting cell (12" x 12") composed of two plates of glass ¼" thick and an interposed compressible gasket adapted to give a finished sheet ¼" in thickness.

The filled cell was placed in a horizontal position and the cell exposed at room temperature to irradiation from a mercury arc at a distance of 15" above the cell for four hours. At the end of this time the polymerization was complete and a solid resin sheet was formed having a mottled pattern exhibiting integral sheen similar to that shown in Fig. 2.

Example II

Monomeric methyl methacrylate containing 0.0015% of alpha,alpha'azobis(alpha,gamma,dimethylvaleronitrile) as a thermal polymerization catalyst, was heated at 55° C. until it thickened to a syrup having at room temperature a viscosity of about 15 poises. Using this syrup, the following formulation was prepared:

| | Parts |
|---|---|
| Methyl methacrylate syrup | 700 |
| Paispearl paste | 8 |
| Benzoin (photopolymerization catalyst) | 0.8 |

After thorough mixing, the above formulation was poured into a conventional sheet casting cell (12" x 12") composed of two plates of glass ¼" thick and interposed compressible gasket adapted to give a finished cast sheet ¼" in thickness.

The cell was then placed on a turntable and rotated in a horizontal position 15" below a mercury arc lamp. The cell was irradiated for a period of about 3 hours after which time a sharp mottled pattern developed in the sheeting. The cell was then removed from the turntable, and placed in an oven at 54° C. in a horizontal position to complete the polymerization. The use of a turntable is by no means necessary and simply gives additional assurance that each part of the cell will receive the same exposure as each other part. The turn table must be rotated slowly enough so that no appreciable centrifugal force is developed as, otherwise, the pattern would be distorted.

Example III

Monomeric methyl methacrylate containing 0.0029% of lauroyl peroxide as a thermal polymerization catalyst, was heated at 70° C. until it thickened to a syrup having at room temperature a viscosity of about 23 poises. Using this syrup, the following formulation was prepared:

| | Parts |
|---|---|
| Methyl methacrylate syrup | 900 |
| Paispearl paste | 3 |
| Benzoin (photopolymerization catalyst) | 0.6 |
| Alpha,alpha'azobis(alpha,gamma,dimethylvaleronitrile) (both a thermal and photopolymerization catalyst in this instance) | 0.065 |

After thorough mixing, the above formulation was poured into a conventional sheet casting cell (12" x 12") composed of two plates of glass ¼" thick and an interposed compressible gasket adapted to give a finished sheet 0.375" in thickness.

The cell was placed in an air oven (room temperature) in a horizontal position 4" beneath a bank of four BL-360 lights for a period of one hour (BL-360 fluorescent lights produce "black light" of maximum intensity at approximately 3600 Angstroms wave length). Thereafter, the polymerization was completed in an air oven at 54° C. in four hours while the cell was maintained in a horizontal position. During the period of irradiation, a contrasty mottled pattern was developed, and this pattern appeared in the completely polymerized casting.

Example IV

Monomeric methyl methacrylate containing 0.0029% of lauroyl peroxide as a thermal polymerization catalyst, was heated at 70° C. until it thickened to a syrup having at room temperature a viscosity of about 23 poises. Using this syrup the following formulation was prepared:

| | Parts |
|---|---|
| Methyl methacrylate syrup | 900 |
| Paispearl paste | 3 |
| Benzoin (photopolymerization catalyst) | 2.6 |
| Alpha,alpha'azobis (alpha,gamma,dimethylvaleronitrile) (both a thermal and photopolymerization catalyst in this instance) | 0.065 |

After thorough mixing, the above formulation was poured into a conventional sheet casting cell (12" x 12") composed of two plates of glass ¼" thick and an interposed compressible gasket adapted to give a finished sheet 0.375" in thickness.

The loaded cell was then tilted at an angle of 45° to the horizontal and placed 4" beneath a bank of four BL-360 lights for a period of one hour. The lights were also tilted at an angle of 45° so that the rays of light were propagated substantially perpendicular to the surface of the cell.

After irradiation for one hour, the cell was then placed in a horizontal position in an air oven at 54° C. to complete the polymerization. A mottled pattern was developed in the casting, but the general configuration was somewhat modified from that produced according to Example III owing to the procedure of irradiating the cell at an angle.

Example V

Monomeric methyl methacrylate containing 0.002% of benzoyl peroxide as a thermal polymerization catalyst, was heated at 70° C. until it thickened to a syrup having at room temperature a viscosity of about 20 poises. To a portion of this syrup was added an equal portion of polyethylene glycol 200 dimethacrylate, a dimethacrylate ester of a mixture of glycols having the formula $HO(CH_2CH_2O)_nH$ wherein $n$ is an integer (preferably from 1 to 20), said mixture of glycols having an average molecular weight of approximately 200. The following formulation which had a viscosity of 8 poises was used:

|   | Parts |
|---|---|
| Methyl methacrylate syrup | 350 |
| Polyethylene glycol 200 dimethacrylate | 350 |
| Paispearl paste | 8 |
| Benzoin (photopolymerization catalyst) | 0.8 |

The thoroughly mixed syrup composition was then poured into a cell (as described in previous examples) adapted to give a finished sheet ¼" in thickness. The cell was then disposed in a horizontal position 5" beneath a bank of four BL-360 lights for a period of ¾ hour. A mottled pattern developed in the polymerizing body in the course of this irradiation, and the polymerization was completed in an air oven at 54° C. while the cell was maintained in a horizontal position. A sheet having integral sheen in a mottled pattern similar to that shown in Fig. 2, was obtained.

*Example VI*

Monomeric methyl methacrylate containing 0.0029% of lauroyl peroxide as a thermal polymerization catalyst, was heated at 70° C. until it thickened to a syrup having at room temperature a viscosity of about 10 poises. Using this syrup the following formulation was prepared:

|   | Parts |
|---|---|
| Methyl methacrylate syrup | 3300 |
| Paispearl paste | 11 |
| Alpha,alpha'azobis(alpha,gamma,dimethyl-valeronitrile) (both a thermal and photopolymerization catalyst in this instance) | 0.25 |

After thorough mixing, the above formulation was poured into a conventional sheet casting cell (20" x 20") composed of two plates of glass ¼" thick and an interposed compressible gasket adapted to give a finished sheet 0.375" in thickness.

The cell was then placed in a horizontal position 30" beneath a mercury vapor lamp and irradiated for a period of 2¼ hours. A mottled pattern developed. Polymerization was completed in an air oven at 46° C. while maintaining the cell in a horizontal position.

In all of the foregoing examples the sheets had an over-all mottled pattern similar to that illustrated in Fig. 2 and cast synthetic resin having integral sheen in this mottled pattern is typical of the product obtained by this invention where a major surface of the polymerizing body is exposed substantially uniformly to actinic energy. However, the over-all mottled pattern may be radically altered by controlling the transmission of the actinic energy so that areas of the polymerizing body receive more energy than do adjacent areas until the desired pattern has appeared. This particular embodiment of the invention is illustrated in the following examples:

*Examples VII*

Monomeric methyl methacrylate was maintained at 80° C. for three hours to obtain a syrup having at room temperature a viscosity of about 30 poises. To this syrup was added, based on the weight of syrup, 0.1% benzoyl peroxide and 0.2% benzoin, as polymerization catalysts, and 0.3% of Paispearl paste. After thorough mixing, this syrup was poured into a conventional sheet casting cell composed of two plates of glass ¼" thick and an interposed compressible gasket adapted to give a finished cast sheet ¼" in thickness. One of the glass plates had adhered to its outer surface a series of parallel regenerated cellulose strips ¼" wide and spaced ½" apart. This regenerated cellulose strip, commercial "Scotch tape," was found to have a high opacity to the transmission of ultraviolet light rays.

The filled cell was placed in horizontal position with the plate to which the strips had been adhered uppermost and the cell exposed at room temperature to irradiation from a mercury arc at a distance of 15" above the cell for four hours. At the end of this time the polymerization was complete and a solid resin sheet was formed having integral sheen entirely covering both of its faces. However, instead of an over-all mottled pattern, the integral sheen was in definite parallel bands with clear lines of demarcation hardly thicker than a pencil line between the bands. Within the bands the integral sheen was waved or billowed and gave an exceedingly attractive and unique appearance of considerable depth.

*Example VIII*

Monomeric methyl methacrylate containing 0.002% of benzoyl peroxide as a thermal polymerization catalyst was heated at 70° C. until it thickened to a syrup having at room temperature a viscosity of about 30 poises. To this syrup was added 0.2% benzoin, as a photopolymerization catalyst, and 0.4% of pearl essence paste. The syrup was then poured into a cell as described in Example VII but one plate of the cell had adhered to its outer surface a series of parallel strips of kraft paper ¼" in width and spaced ½" apart and a second similar series of strips running at right angles to the first series.

The filled cell with the plate to which the strips had been attached, uppermost was placed in horizontal position and exposed to direct sunlight for ten hours. At the end of this time a cast sheet of solid polymer resulted having integral sheen entirely covering both of its faces. In this instance the characteristic over-all mottled pattern was replaced by a series of squares of integral sheen, each being sharply delineated by clear lines of demarcation about the thickness of a pencil line. Within each square the integral sheen was not flat but gave a visual impression of considerable depth, somewhat as if a series of cushions of some pearlescent substance had been imbedded in the sheet.

The above examples are merely illustrative and the invention broadly comprises suspending light-reflecting lamellae in a polymerizable liquid organic compound adapted to give a polymer solid at normal temperatures, subjecting a body of the resulting mixture to a source of actinic energy to induce polymerization thereof and continuing to subject the body to a source of actinic energy until a pattern appears therein, and thereafter subjecting the body to polymerization conditions until polymerization is substantially complete.

It will be apparent to those skilled in the art that neither the specific type of mold, always providing its walls permit transmission of actinic energy, nor the specific source of actinic energy is limited in this invention. Where thermal energy is employed to complete the polymerization, heated gases may be used as well as heated liquids. The temperature at which the polymerization is carried out, may vary from room temperature up to 130° C. depending upon the various factors well known to those skilled in the art of casting polymerizable organic compounds. The selection of an optimum temperature under any given conditions will be based on the usual considerations of the prior art and will not be appreciably influenced by any specific considerations relating to the instant invention.

The invention is manifestly applicable broadly to liquid organic compounds that may be polymerized to polymers solid at ordinary temperatures. Obviously, the invention is of greater value as applied to those compounds which give solid polymers of the most useful properties and, normally the invention will be applied to organic compounds which give rigid castings.

A large class of liquid organic compounds adapted for use in this invention are the ethylenically unsaturated compounds which are polymerizable by the action of light or heat. Among such compounds are the amides, esters and nitriles of acrylic, chloroacrylic and alkacrylic acids, e. g., methacrylamide, methyl acrylate, methyl chloroacrylate, methyl methacrylate, ethyl methacrylate, butyl methacrylate, ethoxy-ethyl methacrylate, glycol dimethacrylate, methyl ethacrylate, ethyl ethacrylate, acrylonitrile, methacrylonitrile; other vinyl and vinylidene compounds, e. g., vinyl acetate, vinyl chloride, vinylidene chloride, vinyl ethers, styrene, methyl styrene, allyl chloride and dimethyl itaconate.

While a number of the more prominent and representative polymerizable compounds have been specifically mentioned above, it is impractical to attempt to list them all and entirely unnecessary as those skilled in the art are well familiar with this class of organic compounds and will readily appreciate from the present disclosure that the invention is operative with respect to any polymerizable liquid organic compound which will give a polymer solid at normal temperatures, i.e., room temperature and ordinarily encountered atmospheric temperatures. The ethylenically unsaturated compounds having non-conjugated double bonds are well known to be the polymerizable compounds giving synthetic resin castings having the most useful properties.

It is an essential part of this invention that light-reflecting lamellae be mixed with the polymerizable liquid organic compound, and such materials included under this classification are well known in the art. For example, the well known pearl essence obtained from fish scales, mercurous chloride, basic lead carbonate "pearl" pigment, lead iodide in the form of light-reflecting lamellae, and numerous metal bronzing powders such as aluminum-bronze "pearl," "gold" bronze, copper-aluminum alloy bronzes and the like may be used. Normally, from 0.005% to 20%, by weight of the polymerizable liquid compound, will be used although, manifestly, a proportion outside this range may be used if it gives the desired effect.

Except with polymerizable compounds which are exceedingly readily polymerized, the use of a polymerization catalyst is advisable. When the polymerization is to be completed by thermal means, it is recommended that a combination of a thermal and photopolymerization catalyst be used. Various photopolymerization catalysts are disclosed in Agre U. S. Patents 2,367,660 and 2,367,661 and Howk et al. U. S. Patent 2,413,973, including the proportions in which they are conventionally used. Suitable photopolymerization catalysts include benzoin and similar vicinal ketaldonyl and acyloin compounds as disclosed in the above Agre patents and various azo-type catalysts such as alpha,alpha'azodiisobutyronitrile, as disclosed in Salisbury U. S. application Serial No. 655,013, which latter may function also as thermal polymerization catalysts. These various catalysts will be used in such catalytic amounts as they would be in any ordinary casting operation, the present invention not requiring any specific variation from such proportions. With castings that are to be completely polymerized by light, a thermal polymerization catalyst normally would not be added to the polymerizable liquid.

Thermal polymerization catalysts which may be used include benzoyl peroxide, lauroyl peroxide, acetyl benzoyl peroxide, diacetyl peroxide, tertiary butyl perbenzoate, p-chloro benzoyl peroxide, and such azo catalysts as alpha,alpha'azodiisobutyronitrile. In several of the examples, an azo catalyst was used in conjunction with a peroxide catalyst. This combination is by no means essential in carrying out the invention but it is efficient. The peroxide catalyst is used in very low concentration and serves as the catalyst in thickening the monomer to a syrup, but at the end of this period this catalyst is substantially used up and the azo catalyst subsequently added serves as the primary thermal polymerization catalyst when polymerization is completed by thermal means.

Various dyestuffs, plasticizers, lubricants, and other modifiers may be incorporated with the polymerizable liquid organic compounds to obtain certain desired characteristics in the finished product, according to well-known practices in the art. It is ordinarily preferable to start with the polymerizable liquid organic compound in partially polymerized condition, i. e., as a more or less viscous syrup rather than with straight organic liquid. The use of syrup shortens the duration of the process and also reduces any tendency of the light-reflecting lamellae to settle out under the influence of gravity as described hereinbefore.

In carrying out the process of this invention it is, of course, essential that polymerization (aside from thickening the monomer to a syrup which is ordinarily done by thermal polymerization) be effected by actinic energy until a pattern appears in the polymerizing body. Subsequent to that point, photopolymerization may be continued and will be if the mottled pattern is not definite enough, but once the mottled pattern appears as definite as it is desired, subsequent polymerization will preferably be carried out by thermal energy because this is quicker. The mottled pattern is preserved during the course of the thermal polymerization as it appeared when the photopolymerization was terminated, substantially without change. Although the temperature at which the thermal polymerization is carried out, may vary anywhere from room temperature to 130° C., a temperature between 30° C. and 90° C. will be used in most instances. The optimum temperature will vary within this range depending upon the specific polymerizable organic compound used, the volume of polymerized compound, and shape of the mold, among other factors, such considerations being familiar to those skilled in the art. The polymerization by actinic energy will usually be carried out at room temperature although any temperature may be employed that does not encourage thermal polymerization to any large extent prior to the point where the pattern has developed to the extent desired.

As shown in Examples VII and VIII, the blocking off of actinic energy in areas of the body of polymerizable liquid containing light-reflecting lamellae will break up the characteristic over-all mottled pattern normally obtained in carrying out this invention and give a cast synthetic resin having integral sheen in predetermined patterns. This procedure is a specific variation coming within the scope of the broad invention and is claimed and more particularly described in application Serial No. 770,887, filed August 29, 1947, in the name of the present applicant. The invention disclosed in application Serial No. 770,887 is broader than the instant invention in that it is applicable to polymerizable liquids having suspended therein effect materials which effect materials may be light-reflecting lamellae or ordinary pigments which latter give patterned effects but without the integral sheen obtained when light-reflecting lamellae are used. On the other hand, the present invention is restricted to suspensions of light-reflecting lamellae in the polymerizable liquid and always results in a cast synthetic resin having integral sheen which may be in a regular, substantially geometric pattern or, if the actinic light is not blocked off in areas of the polymerizing body, in a characteristic over-all mottled pattern.

An outstanding advantage of the present invention is that it provides a highly practical and convenient means of obtaining cast synthetic resin sheets or other bodies having integral sheen. A further advantage is that the invention provides a simple, economical, and effective way of directly casting synthetic resin sheets having integral sheen. A further advantage of the invention is that it provides a means of obtaining synthetic resin sheets and the like, having integral sheen in patterned effects heretofore unknown.

As many apparently widely different embodiments of this invention may be made without departing from the spirit and scope thereof, it is to be understood that the invention is not limited to the specific embodiments thereof except as defined in the appended claims.

I claim:

1. Process of preparing cast synthetic resin having integral sheen which comprises suspending light-reflecting lamellae in a polymerizable liquid organic compound adapted to give a polymer solid at normal temperatures, subjecting a body of the resulting mixture to a source of actinic light to induce polymerization thereof and continuing to subject said body to a source of actinic light until a pattern resulting from arrangement of said light-reflecting lamellae appears in said body, and thereafter subjecting said body to thermal energy until polymerization thereof is substantionally complete, said body being maintained in a quiescent state throughout said polymerization until said light-reflecting lamellae are immobilized.

2. Process of preparing cast synthetic resin sheets having integral sheen which comprises suspending light-reflecing lamellae in a polymerizable liquid organic compound adapted to give a polymer solid at normal temperatures, introducing the resulting mixture into a cell composed of two plates separated by a compressible gasket, at least one of said plates being capable of transmitting actinic light to the contents of said cell, subjecting said cell to a source of actinic light to induce polymerization of said cell contents and continuing to subject said cell to a source of actinic light until a pattern resulting from arrangement of said light-reflecting lamellae appears in the polymerizing body in said cell, and thereafter subjecting said polymerizing body to thermal energy until polymerization thereof is substantially complete, said body being maintained in a quiescent state throughout said polymerization until said light-reflecting lamellae are immobilized.

3. Process as set forth in claim 1 wherein said polymerizable liquid organic compound is methyl methacrylate.

4. Process as set forth in claim 1 wherein said polymerizable liquid organic compound is methyl methacrylate containing both a photopolymerization catalyst and a thermal polymerization catalyst.

5. Process as set forth in claim 2 wherein said polymerizable liquid organic compound is methyl methacrylate.

6. Process as set forth in claim 2 wherein said polymerizable liquid organic compound is methyl methacrylate containing both a photopolymerization catalyst and a thermal polymerization catalyst.

7. Process of preparing cast synthetic resin having integral sheen which comprises suspending light-reflecting lamellae in a polymerizable liquid organic compound adapted to give a polymer solid at normal temperatures, subjecting a body of the resulting mixture to a source of actinic light to induce polymerization thereof and continuing to subject said body to a source of actinic light until a pattern resulting from arrangement of said light-reflecting lamellae appears in said body, and thereafter further polymerizing said body until polymerization thereof is substantially complete, said body being maintained in a quiescent state throughout said polymerization until said light-reflecting lamellae are immobilized.

8. Process as set forth in claim 7 wherein said polymerizable liquid organic compound is methyl methacrylate.

BARNARD M. MARKS.

REFERENCES CITED

The following references are of record in the file of this patent:

UNITED STATES PATENTS

| Number | Name | Date |
|---|---|---|
| 2,265,226 | Clewell et al. | Dec. 9, 1941 |